: 2,957,359
Patented Oct. 25, 1960

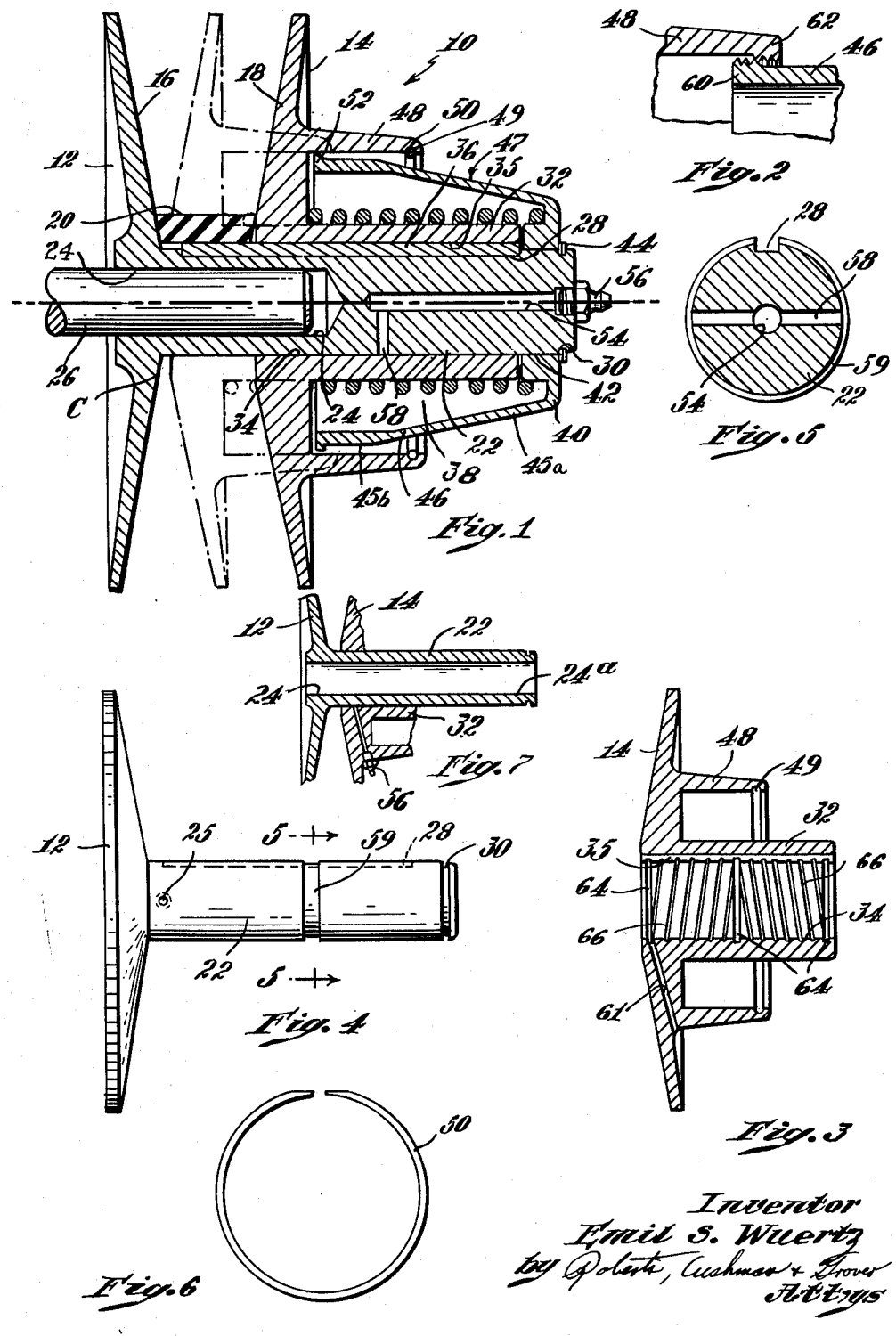

2,957,359

VARIABLE SPEED PULLEY

Emil S. Wuertz, Hingham, Mass., assignor to The Murray Company of Texas, Inc., Dallas, Tex., a corporation of Delaware Filed Dec. 27, 1955, Ser. No. 555,384

2 Claims. (Cl. 74—230.17)

This invention relates to variable speed pulleys and more especially to improvements in a pulley of the kind embodying a preloading spring unit.

The principal objects of the invention are to provide a preloaded pulley in which the loading is associated exclusively with one-half of the pulley and the halves may be disassembled for cleaning without unloading the loading means associated with the one-half; to provide a construction which will visibly indicate that the loading means associated with the one-half is not under constraint by the means holding the halves in operative position so that the millwright or other person dismantling the pulley for cleaning will know that the released halves will not fly apart violently; to provide means for controlling the loading means in the one-half against accidental release and yet permitting ease of disassembly when desired; to provide a construction wherein there are a minimum number of parts; wherein the parts can be manufactured and assembled with the least amount of difficulty; and to provide a composite structure which is attractive in appearance.

As herein illustrated the pulley comprises pulley halves arranged on telescoping hubs to be moved relative to each other to change their spacing, a retaining element for preventing disassembly, and a compressible unit disposed between one of the pulley halves and the retaining element which yieldably resists displacement of the one-half away from the other half, characterized in that when the one-half is undisplaced there is a clearance between the pulley halves. The compressible unit is comprised of a two-part casing within which a spring is contained, the parts being telescopingly associated and their adjacent ends being limited as to separation by interengageable means at these ends, at least one of which is removable. One part of the casing is fast to the exterior side of the one pulley half and the other is mounted on the hub so as to abut the retaining means. The one part has a substantially cylindrical wall and the other a wall which is partly cylindrical and partly tapered, the cylindrical portion having a lesser diameter and axial length than that of the one part so that by telescoping the parts the tapered portion may be moved into the one part to provide an annular clearance between the parts which will afford access to the removable one of the interengageable means. The interengageable means limiting separation of the casing parts are preferably a split ring seated within an annular groove internally of one part and an annular shoulder on the other part of greater diameter than the inside diameter of the ring. Clearance between the parts is preferably less than the crosssectional diameter of the ring so as to prevent accidental dislodgment of the ring except when the parts are telescoped to bring the tapered portion opposite the ring. Alternatively the aforesaid interengaging means may be constituted by mating threaded shoulders, one on each of the parts, which are movable beyond each other by screwing one threaded shoulder through the other to bring the parts into telescoping position where they are maintained by overlap of the threaded shoulders.

The invention will now be described in greater detail with reference to the accompanying drawings wherein:

Fig. 1 is a diametrical section through the pulley, showing the position of the pulley halves when the belt is disposed therebetween in full lines and the position of the movable one of the pulley halves when the belt is removed in dotted lines;

Fig. 2 is a fragmentary section of an alternative form of means for limiting separation of the telescoping parts of the spring casing;

Fig. 3 is a diametrical section through the half of the pulley that has integral with it one of the telescoping parts of the spring casing;

Fig. 4 is an elevation on the other half of the pulley;

Fig. 5 is a section taken on the line 5—5 of Fig. 4;

Fig. 6 is a plan view of a split snap ring for constraining separation of the telescoping casing parts; and Fig. 7 is a fragmentary section showing a hub designed to receive a shaft from either end.

Referring to Fig. 1 the pulley 10 has two pulley halves 12 and 14 having respectively, inclined surfaces 16 and 18 disposed in opposed relation to each other to provide an annular groove, the walls of which converge to receive a belt 20 for slow speed near the bottom of the groove, as shown in full lines in Fig. 1, and high speed near the top of the groove when the pulley is the driving member but vice versa if the pulley is the driven member.

The half 12 has projecting from its right side a laterally extending hub 22 which contains an axial bore 24 commencing at its left end for reception of a shaft 26 which may be a driving member for the pulley or a member driven by the pulley. A hole 25 is provided in the hub 22 for receiving a set screw for the purpose of non-rotatably fixing the hub to the shaft. The hub 22 also has along it a keyway 28 in which there is pressfitted a key 36 and near its right end an annular groove 30. The half 14 has projecting from its right side a laterally extending hub 32 through which is an axial passage 34 containing a keyway 35 and is adapted to be telescopically mounted on the hub 22 for axial sliding movement thereon but to be restrained against turning relative to the hub 22 by the key 36. A retaining ring 44 seated in the groove 30 holds the halves in cooperative relation.

A strong coiled spring 38 is mounted on the hub 22 and is contained under compression within an expandible two-part telescoping casing carried by the half 14 and abutting the ring 44. One part 48 is a hollow cylindrical drum integral with the right side of the half 14. The inner surface of the drum is substantially uniform in diameter and has near its rim at the inner side a peripheral groove 49 which is substantially half round in right section. The other part is a hollow substantially bell-shaped keeper 47 having a crown 40 and skirt 46, the latter being connected to the drum. The crown 40 has a hole 42 through it for receiving the outer end of the hub 22 and normally abuts the ring 44. The skirt 46 has a conical portion 45a and a cylindrical portion 45b, the cylindrical portion 45b being smaller in diameter than the drum so that it fits within the drum and axially shorter so that when thrust all the way into the drum the conical portion 45a of the skirt will lie opposite the grooved rim of the drum. The adjacent ends of the parts 48, 47 are connected and their extension is limited by a split ring 50 of circular cross-section seated in the groove 49 at the rim of the drum 48 and an outwardly facing shoulder 52 at the rim of the cylindrical portion 45b whose diameter exceeds the inside diameter of the ring 50 when the latter is seated in the groove. To prevent possible dislodgment of the split ring by the pressure of the shoulder against it, at least a portion of the cylindrical part 45b of the skirt 46 has a diameter which is smaller than the inside diameter of the drum 48 by not more than one-half the cross-sectional diameter of the split ring. Thus when the shoulder 52 is engaged with the ring 50 the annular space between the outside diameter of the cylindrical portion 45b of the skirt and the inside diameter of the drum 48 is less than the cross-sectional diameter of the ring and hence it will be impossible for the ring to squeeze out except by complete destruction thereof.

By reason of the foregoing construction it is possible to use a split snap ring 50 of smaller cross-sectional diameter than would otherwise be necessary to confine the springs 38 since the cylindrical portion 45b of the skirt 46 makes it physically impossible for the snap ring to be dislodged so long as the pulley is in operation with the belt between the pulley halves, and even when the ring 44 is removed so long as the telescoping parts of the casing are fully extended under the expansive pressure of the spring 38.

As previously stated the cylindrical portion 45b of the skirt is of less axial length than the corresponding dimension of the drum so that by thrusting the skirt 46 inwardly the conical part 45a of the skirt may be brought opposite the ring. Since the conical part is much smaller in diameter than the inside diameter of the drum there will be enough space between the drum and the skirt so that the ring may easily be inserted or removed from the groove for assembling or disassembling the parts.

In lieu of the ring and shoulder the limiting means may take the form of external and internal threaded shoulders or flanges 60 and 62 (Fig. 2) at the adjacent ends of the cylindrical portion 45b and drum 48 respectively, as shown in Fig. 2. In this form the threads 60 of the cylindrical portion 45b may be screwed clear through the threads 62 of the drum 48 whereupon the telescoping parts are free to move relative to each other but are prevented from being withdrawn by overlap of the threads.

The axial length of the hub 48 and keeper 47 are so chosen that when the shoulder 52 is engaged with the ring 50 or the threaded shoulders 60 and 62 are engaged, that is when the parts are fully distended under the force of the spring 38, the axial distance between the inner side of the pulley half 14 at its hub and the crown 40 of the keeper 47 is less than the axial distance between the fixed inner side of the pulley half 12 at its hub and the retaining ring 44 by a small amount, for example in the order of 1/32 of an inch, this clearance being represented at the lower half of Fig. 1 by the character c. Thus when the belt is removed for disassembly of the pulley the fully distended parts which consist of the pulley movable half 14, drum 48 and keeper 47 may be moved back and forth freely on the hub 22 between the fixed half 12 and the ring 44 about 1/32 of an inch which is sufficient to assure one who is about to disassemble the parts that when he removes the snap ring 44 there is no latent spring pressure which will suddenly be released by removal of the ring.

After the movable pulley half 14 together with the telescoping casing is removed from the hub the casing parts 47 and 48 may be disassembled as previously indicated by forcing the keeper inwardly against the spring 38 until the rim of the keeper skirt bears against the outer side of the pulley half 14 whereupon the split ring 50 may be dislodged from its groove. This may conveniently be done by placing the parts in a vise or press so that they will be under complete control at all times until the spring can be completely relaxed. The annular space afforded by the conical portion 45a of the skirt provides ample space within which to insert a tool suitable to dislodge the split ring 50 or insert it as the case may be.

For the purpose of lubrication the hub 22 has an axial passage 54 which commences at its right end and extends part way through it. The open end of the passage is threaded for receiving an Alemite fitting 56 and the inner end has radial extensions 58 which terminate in a peripheral groove 59 at the surface of the hub. As shown in Fig. 3 the inner surface of the hub 22 of the half 14 has axially spaced grooves 64, one at each end and one midway between them connected by spiral grooves 62 of opposite helix so that lubricant supplied to the passage 54 through the Alemite fitting will reach the interfaces by way of the groove 59 and be distributed in opposite directions along the hub by the helical grooves 66. A radial passage 61 extends through the outer hub and pulley flange and provides egress for the lubricant so that during lubrication by means of a pressure gun applied to the Alemite fitting it can be readily determined when sufficient lubricant has been introduced by the appearance of lubricant at the outer end of the passage 61.

Fig. 7 shows an alternative construction wherein the hub 22 has an axial hole 24a all the way through it so that the pulley may be mounted on the shaft 26 from either side or the pulley may be placed on a continuous length of shafting. In this case the Alemite fitting 56 is installed at the outer extremity of the passage 61 so that lubricant may be forced through this passage to the interfaces between the hubs.

From the foregoing it becomes at once apparent that the pulley as thus constructed has decided advantages over preloaded pulleys of prior design for the reason that it is self-evident that no danger is involved in disassembling the parts, dismantling may be accomplished easily, and the number of parts required is reduced thereby simplifying manufacture and assembly.

It should be understood that the present disclosure is for the purpose of illustration only and that this invention includes all modifications and equivalents which fall within the scope of the appended claims.

I claim:

1. In a variable speed pulley, a hub having a flange fixed thereto, and an assembly slidably mounted on the hub, said assembly including in axially disposed relation a movable flange opposite the fixed flange, a housing telescopingly associated with the movable flange and movable relative thereto between predetermined contracted and extended positions, and a spring situated between the movable flange and housing yieldingly holding the movable flange and housing extended, and means on the hub, spaced from the fixed flange by an amount greater than the axial length of the assembly when the latter is extended, for holding the assembly on the hub with a predetermined amount of play between the fixed flange and the assembly, said assembly being freely movable between said fixed flange and said last-named means into engagement with the fixed flange when pressed toward the flange and into engagement with the last-named means when pulled away from the fixed flange.

2. In a variable speed pulley, a pair of pulley halves, a hub projecting laterally from one-half, the other half being slidably mounted on the hub for movement relative to the one-half, a two-part telescoping housing surrounding the hub, one part being carried by the movable half of the pulley, and the other part being slidably mounted on the hub, means at the adjacent ends of the telescoping parts engageable to limit the distension of the parts, a spring situated within the housing holding the parts distended and a retaining ring on the hub, engaging said other half to retain the housing on said hub, the distance between the fixed flange and the retaining ring being greater than the axial length of the movable half and telescoping housing associated therewith when fully distended.

References Cited in the file of this patent

UNITED STATES PATENTS

| | | |
|---|---|---|
| 824,022 | James | June 19, 1906 |
| 2,287,326 | Reeves et al. | June 23, 1942 |
| 2,582,067 | Reeves | Jan. 8, 1952 |

FOREIGN PATENTS

| | | |
|---|---|---|
| 407,479 | France | Mar. 1, 1910 |